(12) United States Patent  (10) Patent No.: US 9,216,781 B2
Ohm et al.  (45) Date of Patent: *Dec. 22, 2015

(54) MANEUVERING ROBOTIC VEHICLES

(71) Applicant: iRobot Corporation, Bedford, MA (US)

(72) Inventors: Timothy R. Ohm, Grover Beach, CA (US); Michael Bassett, Needham, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,090

(22) Filed: Jan. 17, 2014

(65) Prior Publication Data
US 2014/0142753 A1 May 22, 2014

Related U.S. Application Data

(63) Continuation of application No. 11/842,881, filed on Aug. 21, 2007, now Pat. No. 8,644,991.

(60) Provisional application No. 60/828,611, filed on Oct. 6, 2006.

(51) Int. Cl.
*B25J 5/00* (2006.01)
*B62D 55/075* (2006.01)
*G05D 1/02* (2006.01)

(52) U.S. Cl.
CPC .............. *B62D 55/075* (2013.01); *B25J 5/005* (2013.01); *G05D 1/0246* (2013.01); *G05D 2201/0207* (2013.01); *G05D 2201/0209* (2013.01); *Y10S 901/01* (2013.01)

(58) Field of Classification Search
CPC .......... B25J 5/005; B25J 9/1605; B25J 9/162; B25J 19/021; B25J 19/023; B62D 55/075; G05D 2201/0207; G05D 2201/0209; Y10S 901/01; G05B 2219/40513
See application file for complete search history.

(56) References Cited

U.S. PATENT DOCUMENTS

| 1,069,761 | A | 8/1913 | Buckley |
| 2,917,120 | A | 12/1959 | Gates et al. |
| 3,092,200 | A | 6/1963 | Chambers |
| 3,166,138 | A | 1/1965 | Dunn, Jr. |

(Continued)

FOREIGN PATENT DOCUMENTS

| JP | 60176871 | 9/1985 |
| JP | 6032263 | 2/1994 |

(Continued)

OTHER PUBLICATIONS

PackBot "iRobot PackBot Explorer" Brochure.

(Continued)

*Primary Examiner* — Spencer Patton
(74) *Attorney, Agent, or Firm* — Fish & Richardson P.C.

(57) ABSTRACT

Configurations are provided for vehicular robots or other vehicles to provide shifting of their centers of gravity for enhanced obstacle navigation. A robot chassis with pivotable driven flippers has a pivotable neck and sensor head mounted toward the front of the chassis. The neck is pivoted forward to shift the vehicle combined center of gravity (combined CG) forward for various climbing and navigation tasks. The flippers may also be selectively moved to reposition the center of gravity. Various weight distributions allow different CG shifting capabilities.

19 Claims, 13 Drawing Sheets

(56) References Cited

U.S. PATENT DOCUMENTS

| | | |
|---|---|---|
| 3,311,424 A | 3/1967 | Taylor |
| 3,489,236 A | 1/1970 | Goodwin |
| 4,009,761 A | 3/1977 | Meyer |
| 4,027,889 A | 6/1977 | Krofchalk et al. |
| 4,247,125 A | 1/1981 | Rayment |
| 4,477,998 A | 10/1984 | You |
| 4,483,407 A | 11/1984 | Iwamoto et al. |
| 4,492,058 A | 1/1985 | Goldfarb et al. |
| 4,566,550 A | 1/1986 | Misawa |
| 4,566,551 A | 1/1986 | Feliz |
| 4,570,954 A | 2/1986 | Mintz |
| 4,645,222 A | 2/1987 | Hester |
| 4,674,585 A | 6/1987 | Barlow et al. |
| 4,687,068 A | 8/1987 | Pagett |
| 4,688,813 A | 8/1987 | Misawa et al. |
| 4,702,331 A | 10/1987 | Hagihara et al. |
| 4,709,773 A | 12/1987 | Clement et al. |
| 4,730,684 A | 3/1988 | Pedersen |
| 4,813,906 A | 3/1989 | Matsuyama et al. |
| 4,898,256 A | 2/1990 | Lehner |
| 4,919,489 A | 4/1990 | Kopsco |
| 4,932,491 A | 6/1990 | Collins, Jr. |
| 4,932,831 A | 6/1990 | White et al. |
| 4,977,971 A | 12/1990 | Crane, III et al. |
| 4,993,912 A | 2/1991 | King et al. |
| 5,022,812 A | 6/1991 | Coughlan et al. |
| 5,174,405 A | 12/1992 | Carra et al. |
| 5,197,558 A | 3/1993 | Misawa |
| 5,248,008 A | 9/1993 | Clar |
| 5,308,098 A | 5/1994 | Shea |
| 5,337,846 A | 8/1994 | Ogaki et al. |
| 5,413,367 A | 5/1995 | Ochiai |
| 5,507,358 A | 4/1996 | Abe et al. |
| 5,515,934 A | 5/1996 | Davis |
| 5,579,857 A | 12/1996 | Abe et al. |
| 5,833,248 A | 11/1998 | Eguchi |
| 5,868,403 A | 2/1999 | Culp et al. |
| 5,884,718 A | 3/1999 | Yamashiro et al. |
| 5,890,553 A | 4/1999 | Bar-Cohen et al. |
| 5,921,843 A | 7/1999 | Skrivan et al. |
| 6,099,091 A | 8/2000 | Campbell |
| 6,144,180 A | 11/2000 | Chen et al. |
| 6,158,536 A | 12/2000 | Misawa |
| 6,216,807 B1 | 4/2001 | Eckhoff |
| 267,196 A1 | 7/2001 | Wilcox et al. |
| 6,263,989 B1 | 7/2001 | Won |
| 6,431,296 B1 | 8/2002 | Won |
| 6,523,629 B1 | 2/2003 | Buttz et al. |
| 6,619,414 B2 | 9/2003 | Rau |
| 6,999,849 B2 | 2/2006 | Bridges |
| 7,083,013 B2 | 8/2006 | Chuan |
| 7,475,745 B1 | 1/2009 | DeRoos |
| 2001/0047895 A1 * | 12/2001 | De Fazio et al. ............... 180/22 |
| 2002/0062999 A1 | 5/2002 | De-Noor et al. |
| 2002/0189871 A1 | 12/2002 | Won |
| 2003/0183428 A1 | 10/2003 | Hedeen |
| 2007/0193790 A1 * | 8/2007 | Goldenberg et al. .......... 180/9.1 |

FOREIGN PATENT DOCUMENTS

| | | |
|---|---|---|
| JP | 8152916 | 6/1996 |
| WO | 89/00928 | 2/1989 |

OTHER PUBLICATIONS

PackBot "Tactical Mobile Robot" Brochure.
PackBot "Hazardous Duty Mobile Robot" Brochure.
Autonomous Mobile Robots, Chapter 2; Locomotion Concepts Oct. 9, 2004.
Falcone et al. "The Personal Rover" The Robotics Institute Carnegie Mellon University Pittsburgh, PA 15213; 2002.

* cited by examiner

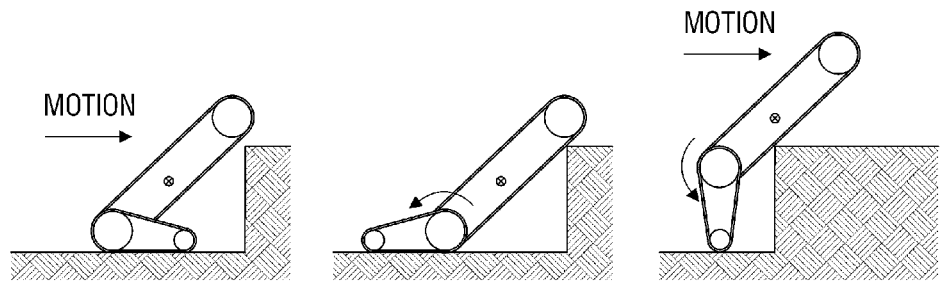
FIG. 8A  FIG. 8B  FIG. 8C
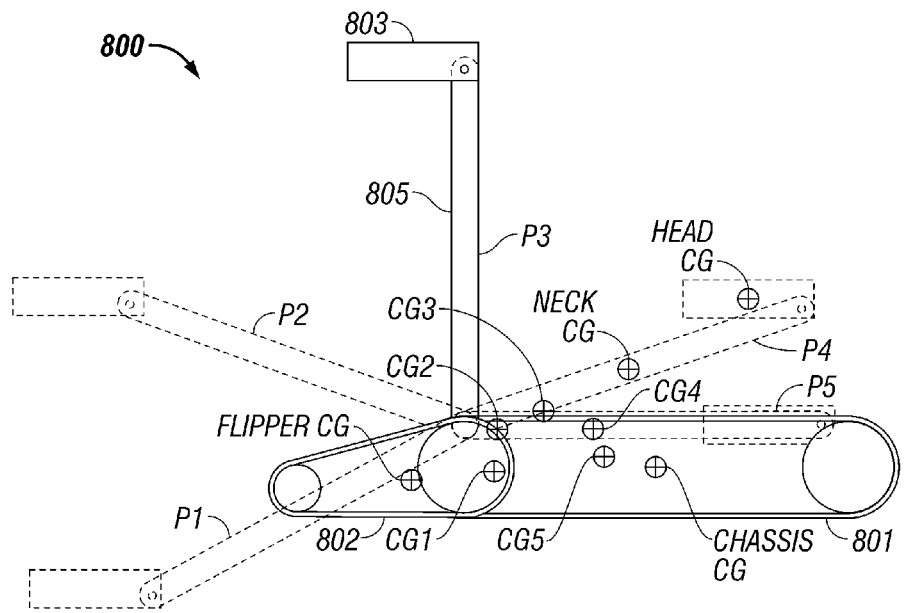
FIG. 9

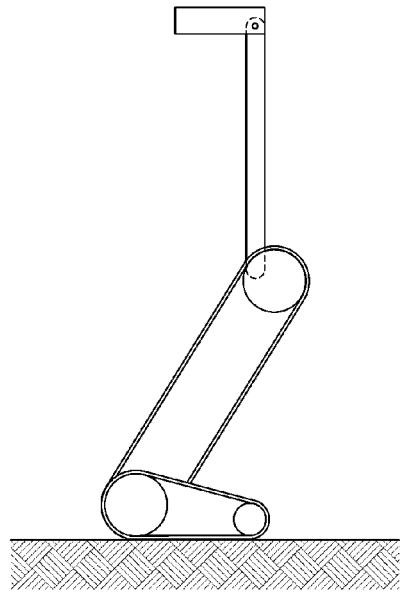 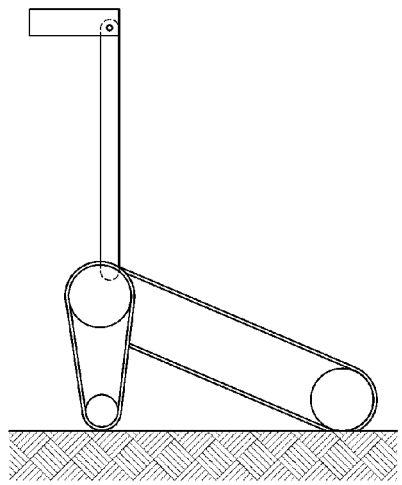
*FIG. 10A*   *FIG. 10B*
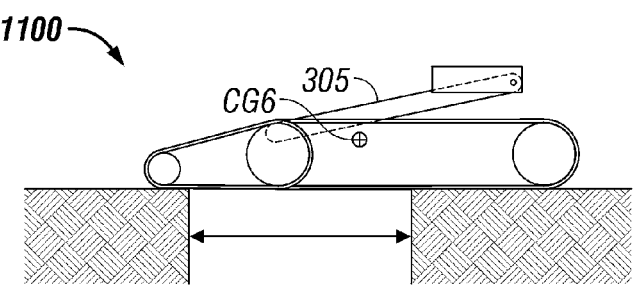
*FIG. 11A*
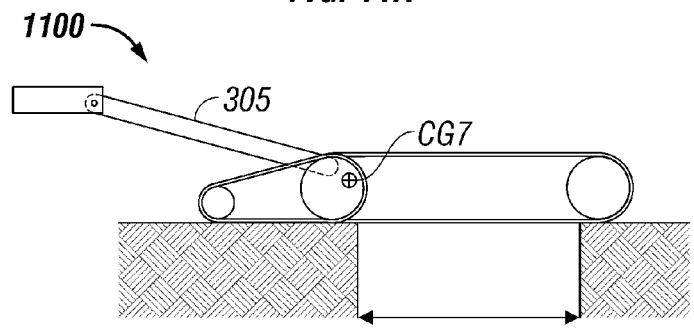
*FIG. 11B*

MANEUVERING ROBOTIC VEHICLES

CROSS REFERENCE TO RELATED APPLICATIONS

This application claims the benefit of U.S. Provisional Application Ser. No. 60/828,611, filed on Oct. 6, 2006, the contents of which are hereby incorporated by reference for all purposes.

STATEMENT AS TO FEDERALLY SPONSORED RESEARCH

This invention was made in part with Government support under contract DAAE07-03-9-F001 awarded by the Technical Support Working Group of the Department of Defense. The Government may have certain rights in the invention.

TECHNICAL FIELD

This invention relates to robotics, and more particularly to mobile robots or vehicles capable of climbing by shifting their center of gravity.

BACKGROUND

Robots are useful in a variety of civilian, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for its inspection or search tasks. Robots designed for military applications may perform operations that are deemed too dangerous for soldiers. For instance, the robot can be used to leverage the effectiveness of a human "pointman." Law enforcement applications include reconnaissance, surveillance, bomb disposal and security patrols.

Small, man-portable robots are useful for many applications. Often, robots need to climb stairs or other obstacles. Generally, a small robot must span at least three stair corners to climb stairs effectively, and must maintain its center of gravity in a central disposition to keep from sliding down the stairs (center of gravity toward lower stair) or from flattening out on a stair (center of gravity toward the upper stair.)

When the size or length of a robot reaches a certain small size relative to the obstacle or stair it must climb, the robot's center of gravity usually has a deleterious effect on climbing ability. What is needed, therefore, is a robot design that can climb obstacles that are large relative to the size of the robot.

SUMMARY

Configurations are provided for vehicular robots or other vehicles to provide shifting of their center of gravity for enhanced obstacle navigation. In preferred embodiments, a robot chassis with articulated driven flippers has an articulated neck and articulated sensor head mounted toward the front of the chassis. The articulated neck is pivoted forward to shift he vehicle combined center of gravity (combined CG) forward for various climbing and navigation tasks. Flippers may also be employed with the CG shifting effect of moving flippers added to that of the pivoting head and neck. Various embodiments may have different weight distributions to allow different CG shifting capabilities.

A preferred embodiment includes a chassis supporting a skid steered drive and having a leading end, a trailing end, and a chassis center of gravity (chassis CG) therebetween, a set of driven flippers, an articulated neck and an articulated sensor head the chassis, set of flippers, neck, and articulated sensor head adapted to move and thereby produce a corresponding adjustment in the vehicle center of gravity. Such adjustment may be employed to allow stair climbing, obstacle navigation, crevasse navigation, or other desired operations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8A-8C depicts a robot using flippers to mount an obstacle backwards.
FIG. 9 shows and example of how a pivotable neck and sensor head contribute significant CG shifting ability.
FIG. 10A-10B depicts elevated neck positions for two configurations.
FIG. 11A-11B depicts a robot in various positions crossing a crevasse.

DETAILED DESCRIPTION

Various tracked robotic vehicles have been developed that are the subject of, for example, U.S. Pat. Nos. 6,431,296, 6,263,989, 6,668,951 and 6,6151,885. These patents are instructive on the construction of tracked robotic vehicles having driven flippers, and means of articulation of robotic components, and are hereby incorporated by reference in their entirety into this application. Other robotic vehicle details and features combinable with those described herein may be found in a U.S. Provisioned filed Oct. 6, 2006, entitled "Robotic Vehicle" and assigned Ser. No. 60/828,606, the entire contents of which are hereby incorporated by reference.

Figure 1:
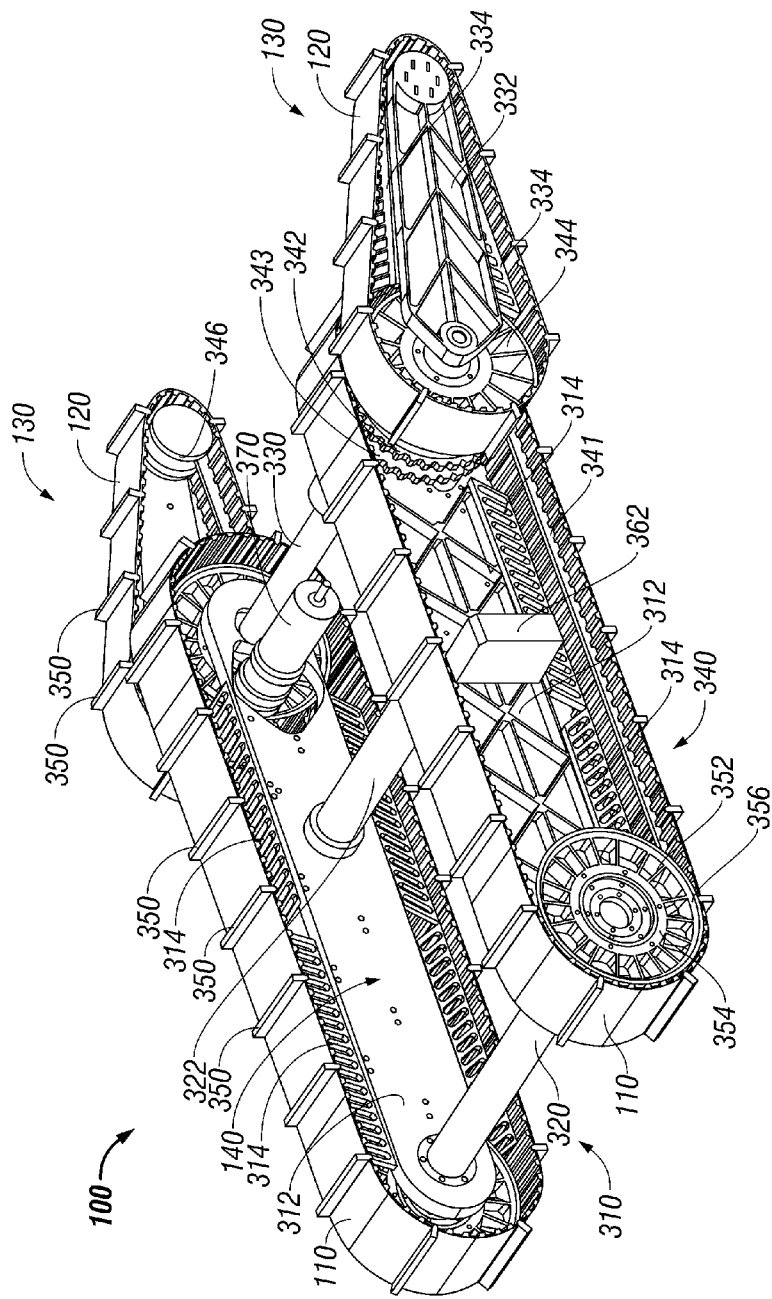
FIG. 1 shows robot with extendable arms or flippers.

FIG. 1 shows robot 100 with extendable arms or flippers 130. The arms are shown fully extended configuration in which forward arms 130 extend beyond the front of main body 140. The combination of forward tracks 120 and main tracks 110 and provide an extended length base. Main body 140 includes a vertically symmetrical rigid frame 310 which includes parallel vertical side plates 312. Side plates 312 are rigidly coupled by tubes 320 and 322 and an articulator shaft 330. The rigid components are designed for strength and low weight and are preferably made from a material such as 7075-T6 aluminum. Alternative versions of the robot can use other materials, such as other lightweight metals, polymers, or composite materials.

Alternative versions of the robot can use other types of tracks, such as tracks made up of discrete elements. However, debris may be caught between elements and such tracks are generally heavier than flexible belts. Other flexible materials can also be used for continuous belt tracks. Referring back to FIG. 1, in this embodiment, each front track 120 is narrower but otherwise similar to main tracks 110, having grooves and a V-shaped segment on the inside surface, and soft cleats 350 attached to the outside surface. A front drive pulley 344 drives each front track 120. Each front drive pulley 344 is toothed and has a central V-shaped channel that loosely mates with the V-shaped rib on the inside of the corresponding front track 120. On each side, front drive pulley 344 is coaxial with main drive pulley 342, and both drive pulleys on a particular side turn in unison on a common axle. A smaller smooth surfaced front idler pulley 346, which also has a V-shaped channel, supports each front track 120 at the extreme end of the corresponding arm 130.

As depicted in FIG. 1, front tracks 120 are supported by arm side plates 332 using front track supports 334. Front track supports 334 are wedge-shaped and each has a series of angled slots similar to those in main track supports 314. The arm side plates 332 on each side of the robot are rigidly coupled to one another through articulator shaft 330, and therefore move together.

Other designs may be employed to produce a robot with such a skid steered drive and driven flippers. For example, some embodiments may employ techniques taught in the various U.S. patents that are incorporated by reference herein.

Figure 2:
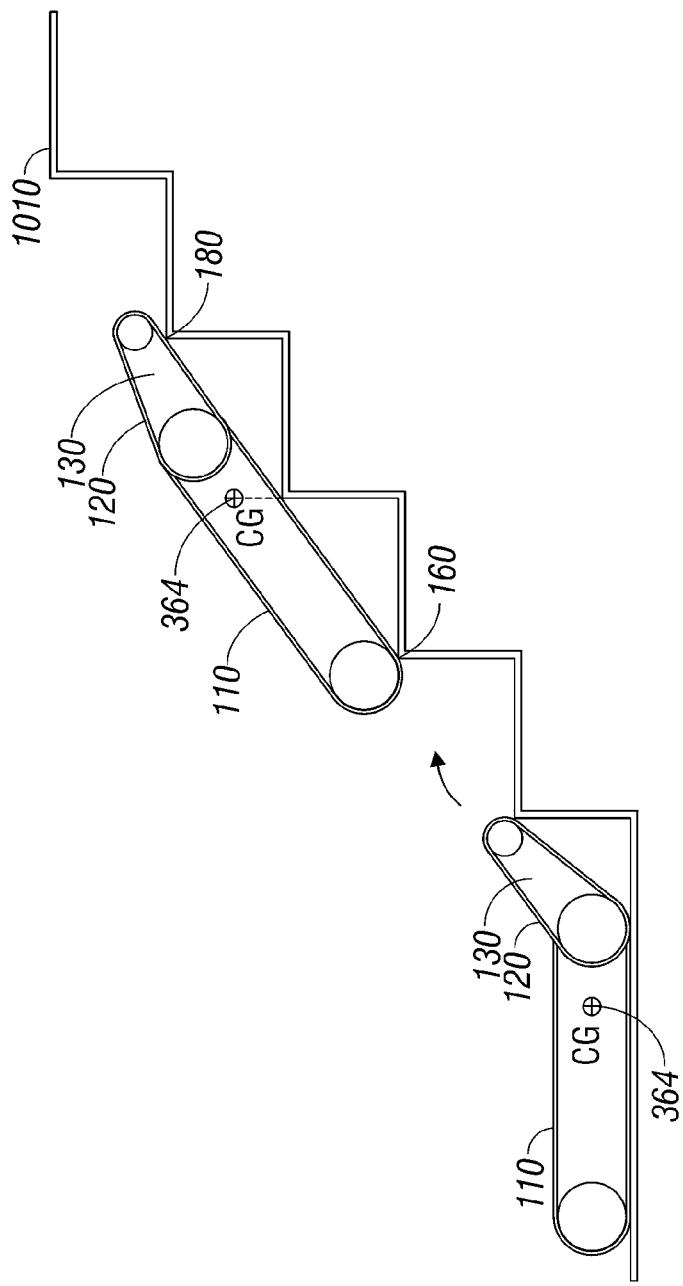
FIG. 2 depicts one method by which a robot may climb stairs.

FIG. 2 depicts one method by which robot 100 may climb stairs. The depicted robot 100 can raise arms 130 in order to mount an obstacle, such as a stair 1010, in its path. To mount the first step of staircase 1010, robot 100 raises its arms 130 and drives forward to raise its main tracks 110 onto the first stair. The robot then assumes a fully extended mode thereby extending its wheelbase to increase it stability and to provide as smooth a ride a possible up the stairs. Soft cleats (not shown in FIG. 2) provide mechanical locking with the stair edge needed to drive the robot up the stairs.

One embodiment of the robot 100 may be specifically dimensioned to climb common stairs, with step dimensions of up to a 17.8 cm (7-inch) rise and 27.9 cm (11-inch) tread. As the robot tilts or inclines, the vertical projection of the center of gravity (CG) with respect to the ground moves backwards. For stable travel on stairs, the extended wheel base of the main and forward tracks in the fully extended mode span a minimum of two steps (i.e. at least 66.2 cm for 17.8 cm by 27.9 cm stairs) such that the vehicle is supported by at least two stair treads at all times. Note that the depicted robot 100 can climb larger stairs for which it cannot span two steps, but the traverse will not be as smooth as the robot will bob with each step.

To avoid nosing up or down (pitch instability) while climbing stairs, the vertical projections of the center of gravity is located in a stable range which is at least one step span (i.e., 33.1 cm (13 inches) for 17.8 cm by 27.9 cm stairs) in front of the furthest rear main track ground contact 160 and at least one step span behind the front most front track ground contact 180.

Alternative versions of the robot can use shorter track dimensions that do not satisfy the requirement of spanning two steps. Without further modifications, however, the center of gravity can be outside the stable range. Such robots may not be as stable on stairs, although inertial effects add to dynamic stability at increased velocities, smoothing the traverse on stairs. Various methodologies may be used to mitigate this and other climbing and terrain traversing problems. Below we describe different embodiments (having different morphologies) for a basic small tracked vehicle system that may have enhanced capability to climb or traverse.

Figure 3:
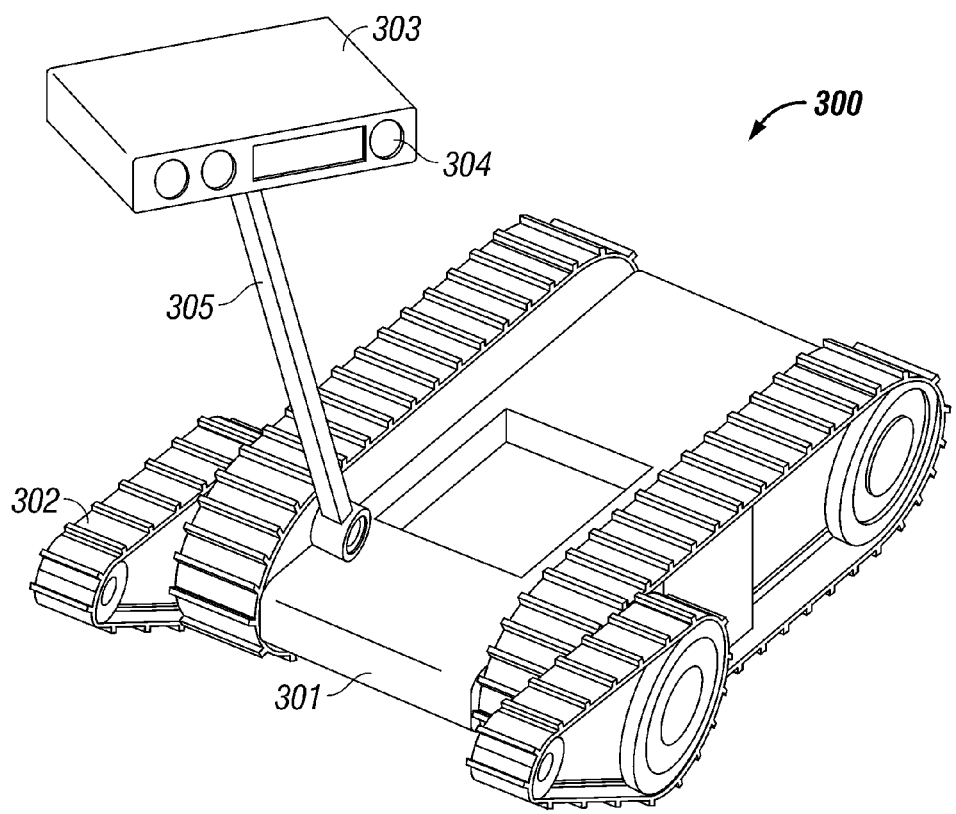
FIG. 3 shows another exemplar tracked vehicle robot.

FIG. 3 shows a exemplar tracked vehicle robot. The depicted system is primarily comprised of four parts: 1) a main tracked vehicle chassis 301, 2) an "flipper" tracks 302 on one end of the vehicle, 3) a sensor head 303 preferably containing drive cameras and other sensors 304, and 4) an neck mechanism 305 that connects head 303 to chassis 301. Many improved robotic vehicle designs may be derivative of this basic platform design. Various designs may be required to carry various payloads such as sensors, transmission equipment, or robotic tools, for example.

The tracked vehicle robot may be required to surmount a variety of obstacles that will require the vehicle center of gravity (CG) to fall within a certain range. These obstacles include, for example, stairs, single vertical steps, and slopes. Included herein are tracked-vehicle morphology capable of meeting these "primary" requirements. Because tracked vehicle robots may be subject to both stringent overall weight and stowed size requirements, it is desirable to be able to negotiate these obstacles with the smallest sized vehicle possible such that these constraints can be met as well. To do this reliably, it is also desirable to achieve all of this with the simplest system possible. Likewise, power consumption of the drive train must be considered to meet varied endurance requirements. Further, the system may be required to elevate the drive sensors 304 to a specific height which may play an important factor is being able to shift the CG to be able to negotiate extreme obstacles.

A typical such obstacle is the ability to climb standard stairs with 7-inch risers by 11-inch landings, for climb higher obstacles. Climbing slopes is sometimes required. These requirements typically need to be met while minimizing weight, and size for portability, maximizing vehicle endurance, and accommodating extra payloads for certain scenarios. Some small tracked vehicle robots require a minimum drive sensor height above the ground to see over obstacles.

Figure 4:
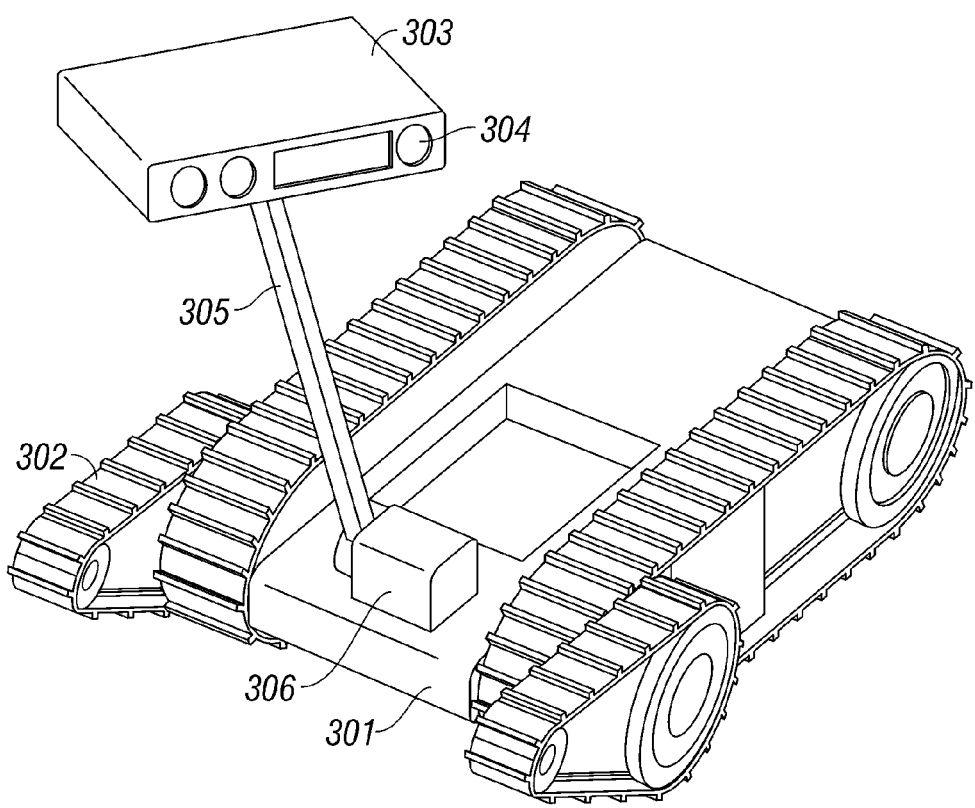
FIG. 4 depicts another tracked robot vehicle.

FIG. 4 depicts another tracked robot vehicle. In this example, neck 305 is attached to chassis centrally, rather than to a vertical wall of the track drive (FIG. 3). The actuator motor 306 in is shown mounted to chassis 301, but may also be provided in a flush housing or other mounting arrangement. Actuator 306 may be powerful enough to move neck and head designs with significant mass for center of gravity shifting (CG shifting) or other applications. Neck 305 may also be provided with tapped holes or other fittings to attach various payloads. Neck 305 may also be relatively much larger in diameter than depicted to provide for housing various components or payloads. Actuators may be backdriveable or nonbackdriveable, which may depend on the types of tasks desired for neck 305. Further, while track-driven robots are shown, other drive means may be used such as wheels. Closely-spaced or overlapping treaded wheels may be used to provide mobility and climbing capability similar to that of a track drive. Such variations typically encompass the main drive, while preferred flippers use tracks. The flipper and chassis track systems may be compliant tracks or rigid sectional tracks.

Depicted in FIG. 4 is a payload storage opening in chassis 301. For "head-forward" embodiments such as those in FIG. 3 and FIG. 4, payload storage is preferably at the front of chassis 301. Payloads may of course also be housed in the track housings on both sides of the chassis, and in or on the neck and head. In some embodiments chassis 301 is configured as depicted with a payload deck, and others may have different structures. Chassis 301 may be provided with tapped holes to accept cargo attachment or fixture attachment. Chassis 301 may also be provided with stowage space or a slot for neck 305 to stow into while in a stowed position such as, for example, P5 depicted in FIG. 9. Head 303 may also be provided with a slot and recessed articulation joint to lower the profile of the head and neck in stowed position. To protect the head, it must stow as much as possible within the profile of the tracks. In one preferred embodiment, the head will approximately be at least 3.8 cm (1.5 inches) thick; likewise, the neck and its pan/tilt actuators will probably require at least another 3.8 cm (1.5 inches) under the head when stowed. Since the track wheel pitch diameter will be around 5 inches, and a typical flipper torque tube will be about 1.9 cm (0.75 inches) diameter (delivering torque from a flipper actuator), this only leaves a little over 5 cm (2 inches) for the head and neck to stow. Therefore it will probably not be possible for the head to stow both over the torque tube and still remain within the track volume.

Chassis 301 is preferably constructed of strong lightweight materials, and may include a shell around an enclosed volume. A structural volume housing electronics may also support the necessary load paths of the system. In the simplest case where the chassis is modeled as a hollow box, there is adequate strength to also support wheels and running gear on the sides of this box.

Some characteristics for three different embodiments are described below. Note that the values depicted are for one possible morphology and that other morphologies can be derived by reallocating weights from one component to another. For example, in typical examples the flippers will be about 10% of the total robot weight. To provide heavier flippers (say by moving the batteries to the flippers), the battery weight (which is typically around 23% but may vary greatly) would be subtracted out of the chassis and added to the flippers, thus making the flippers contain about 33% of the total robot weight. Likewise, a lighter head can be employed if certain components like cameras or transmission gear are removed.

One embodiment of the robot depicted in FIG. 3 and FIG. 4 has the following characteristics, preferred for CG shifting in certain scenarios.

TABLE 1

Weight Distribution for Design 1.

| Component: | Component Weight: | Percentage of overall wt: |
|---|---|---|
| Chassis | 21 lbs | 70 |
| Flippers | 3 lbs | 10 |
| Head | 4.5 lbs | 15 |
| Neck | 1.5 lbs | 5 |
| Payload | 6 lbs (rating) | additional |

The weights and ratios provided may vary slightly and still provide the desired capabilities. Such embodiment also has physical parameters as follows. Track wheel diameter of about 12.7 cm (5 inches); chassis length about 43 cm (17 inches); flipper length about 24 cm (9.5 inches); and neck length about 43 cm (17 inches). Such design provides ability to scale an obstacle in the forward direction having an 8.8 inch height. While these designs have been provided, size and weight ratios may change slightly and still provided the desired climbing and maneuvering enhancements. The three designs herein have been configured to crest standard stair and obstacles in a manner such as depicted in FIGS. 18-21, for example, while still maintaining a robot that can stow flippers and neck to fold into a small, man portable shape. For larger obstacles, the ratios given herein may be scaled appropriately and other ratios may be used successfully with the CG shifting techniques taught herein.

Another embodiment of the robot depicted in FIG. 3 and FIG. 4 has the following characteristics, preferred for CG shifting in certain other scenarios.

TABLE 2

Weight Distribution for Design 2
Table 2: Weight Distribution for Design 2

| Component: | Component Weight: | Percentage of overall wt: |
|---|---|---|
| Chassis | 19.5 lbs | 65 |
| Flippers | 3 lbs | 10 |
| Head | 4.5 lbs | 15 |
| Neck | 3 lbs | 10 |
| Payload | 6 lbs (rating) | additional |

This design has similar size parameters to the first listed design, Design 1. Because it is not desired to add "dead weight" or useless weight, the additional neck weight is preferably a result of attaching payloads to the neck or housing payloads inside the neck, as discussed above. This may be desired, for example, to provide camera or RF surveillance equipment, or other sensors, and recording transmission electronics that are spaced above the ground for optimum propagation characteristics. This configuration allows for CG shifting to enable addressing obstacles of about 22 cm (8.7 inches).

Figure 5:
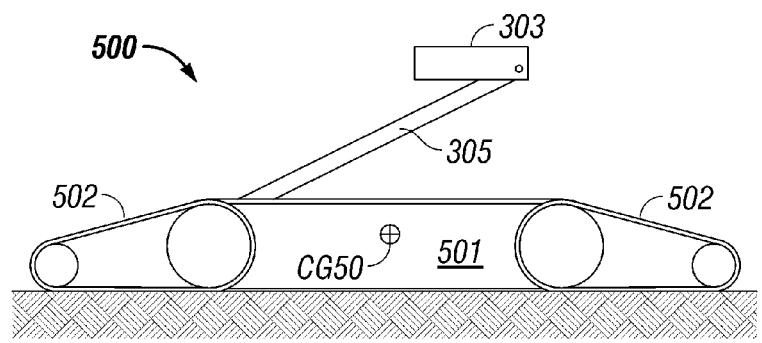
FIG. 5 depicts a side representation of another robot.

FIG. 5 depicts a side representation of another robot. In this robot, lightweight flippers 502 are provided on both ends of chassis 501. Preferably, the lightest feasible head 303 is assumed to offset the extra weight of the rear flippers 502. Chassis 501 is assumed to be slightly shorter than that in the previous embodiment since it is not needed for stability and may be necessary to additionally offset more weight for actuator and extra battery weight (due to added power draw from the extra flipper). Such design has a center of gravity (CG) at the mark CG50 when resting in the depicted position. The added length due to the extra flipper also provides a longer range of locations on which payloads can be mounted without overly shifting the vehicle CG.

TABLE 3

Weight Distribution for Design 3.

| Component: | Component Weight: | Percentage of overall wt: |
|---|---|---|
| Chassis | 22 lbs | 73 |
| Flippers | 3 lbs | 10 each set |
| Head | 1.2 lbs | 4 |

TABLE 3-continued

Weight Distribution for Design 3.

| Component: | Component Weight: | Percentage of overall wt: |
|---|---|---|
| Neck | 0.9 lbs | 3 |
| Payload | 6 lbs (rating) | additional |

The preferred implementation of design 3 also has the following physical parameters: wheel diameter, 12.7 cm (5 inches); chassis length, 38 cm (15 inches); flipper length, 24 cm (9.5 inches); and neck length, 38 cm (15 inches). Such parameters provide ability to scale a forward obstacle of 32.3 cm (12.7 inches) height when using the CG shifting techniques described herein.

While several design variations with different parameters are described, variations in size are accommodated for robots with different intended purposes. The designs included are intended to provide small robots that are man-portable yet capable of climbing stairs. Larger robots, or other vehicles, may have little trouble climbing stairs, but may use the CG shifting techniques described herein to enable crossing crevasses, larger obstacles, or other purposes.

Figure 6A:
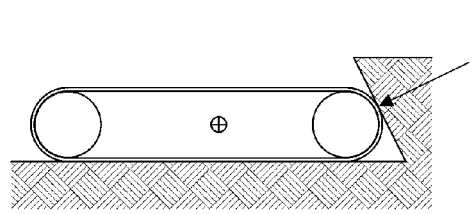
FIG. 6A-6B depicts a robot vehicle encountering an obstacle under two different scenarios.
Figure 6B:
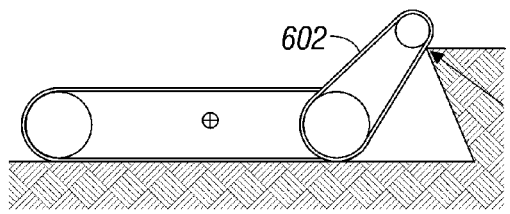

FIG. 6 depicts a robot vehicle encountering an obstacle under two different scenarios. Regarding stairs and obstacles, the first step in negotiating any obstacle is to make sure the vehicle can transition up the obstacle from a flat surface. For example, if the vehicle encounters a vertical wall but cannot at least get the front of the vehicle to climb it, the vehicle typically will not be able to handle any obstacles that are more than one wheel radius. Preferably, the vehicle CG should be as close to the rear axle as possible and the front of the vehicle should encounter the obstacle as high as possible. On top of this, many obstacles may be undercut such that the vehicle may wedge under it (such as fire-escape stairs as depicted in FIG. 6*a*), so having a very high approach point is important (large Y dimension). Also note that such obstacles result in a downward force being applied to the front of the vehicle unless there is some feature on the vehicle that can change this contact angle. It is for these reasons (among others) that the tracked vehicle robot systems preferably have flipper tracks on one end of the vehicle which can be rotated to any orientation, and that this is considered the "front" of the robot. This is depicted in FIG. 6*b*. For clarity, the end of the vehicle with flippers 602 attached is defined as the "front", but a vehicle may be run "backwards" to scale obstacles if this proves beneficial in some cases.

Figure 7:
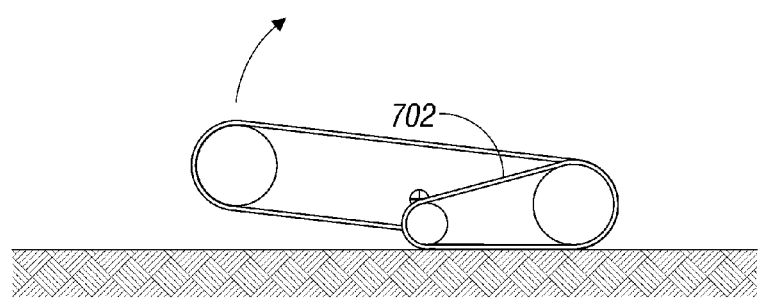
FIG. 7 depicts a robot vehicle having flippers residing within the length of the vehicle.

FIG. 7 depicts a robot vehicle having flippers residing within the length of the vehicle. Such flippers greatly enhance the ability of a small vehicle to scale large objects relative to it size. This is not only due to the reasons above, but also because they increase the vehicle's footprint for a given stowed volume (since the flippers can be folded beside the vehicle when stowed, but can be deployed as necessary for a given obstacle). Flippers also are sometimes employed to right the vehicle when it is inverted. To do so, the vehicle CG must reside within the length of the flipper when it is stowed as shown in FIG. 7.

Assuming the chassis density is somewhat uniform (resulting in its CG being at its geometric center), and the flippers would shift the CG slightly off to the end to which they are mounted, this implies that the flippers typically not be shorter than about 50% of the chassis length. Therefore having the flipper be at least 50% of the chassis length is a good baseline unless the flippers are adapted to have more weight (in which case they could be slightly shorter).

It is also important for the flippers to spin 360 degrees continuously in either direction. This not only is necessary to recover from being inverted, but it also considerably adds to the vehicle mobility over very level and unstable terrain (such as rocks or tall grass). With such movement, the flippers may also act as arms to help pull the vehicle over such terrains.

Depending on what vehicle morphology is employed and where the average CG location is located, the vehicle may be able to surmount larger obstacles backwards than it can forwards. This happens when the vehicle CG is shifted aft and thus the lightweight flippers can be used to elevate the CG over the obstacle. By using the flippers to achieve "prairie-dog" pose (driving on the flipper tracks only), large obstacles can be approached backwards as depicted in FIG. 8. The flippers are then rotated to lift the front of the vehicle up to help scale the obstacle.

As described above, due to the limitations of the design in FIG. 8, an articulated neck may also be added at the back of the robot. In such embodiments, the neck may be moved to adjust the center of gravity (CG) of the robot and optimize obstacle scaling ability.

FIG. 9 shows and example of how a pivotable neck and sensor head contribute significant CG shifting ability. A mobile robot's CG preferably resides in a well-controlled range in order to negotiate a wide array of obstacles. Further, a typical vehicle with a fixed CG would need to have its CG near ground level and near the center of the track footprint. This, unfortunately, is not extremely difficult to achieve since it is difficult to design any "practical" system with the CG so far offset from its volume centroid (most of the volume would need to remain vacant). This is especially true when ground clearance will need to be allotted on the bottom of the chassis.

The alternative to having a fixed CG is having some type of "CG shifting" capability such as that illustrated in FIG. 9. This means that the vehicle CG can be relocated as necessary to negotiate obstacles. In the illustrated example, the flippers 802 do allow for some CG shifting since they can be rotated in any direction and can be designed to contain some percentage of the total weight of robot 800. However, since the flippers need to be in a defined position for many obstacles (and therefore cannot be rotated at will), this limits their ability to contribute adequate CG shifting ability. In contrast, the robot will often be required to have a head that can be elevated via a neck that typically has few constraints regarding its position while scaling obstacles (other than to give a remote operator ample viewing of the surroundings).

The depicted robot 800 in FIG. 9 has a neck 805 that is a single, rigid link. However, some embodiments may have necks with multiple links and articulating joints or "elbows". Neck 805 is illustrated in 5 different positions to illustrate its range of movement. Since the head is often required for scanning ability to have a high reach such as, for example, at least 51 cm (20 inches off of the ground, neck 805 is preferably as long as possible while still stowable atop the robot 801 (represented by black outline in FIG. 9). Having such a long neck 805 means that the head 803 does not need to be a very large percentage of the robot weight (without payload) to result in fairly large CG shifts for the vehicle. In fact, the depiction above represents having only about 15% of the robot weight in the head, and another 5% in the neck itself. A longer neck is preferred for better leverage, so some robots have jointed necks or necks extending, in stowed positions, beyond the end of the chassis.

FIG. 9 depicts various target dots toward the center, each corresponding to a combined robot center of gravity for one position of the head. The depicted range of movement is exemplary, and other ranges of movement may be achieved by placing neck 805 in other locations or changing the shape and design of neck 805, for example. Depicted position P1 produces a combined CG at the location marked CG1, thus lowering and moving forward the combined CG relative to most other positions. Depicted position P2 produces a combined CG at the location marked CG2, which is higher than CG1 and forward of most other positions. Depicted position P3 produces a combined CG at the location marked CG3, this is the highest depicted CG. Depicted position P4 produces a combined CG at the location marked CG4. Depicted position P5 is a stowed position, and produces a combined CG at the location marked CG5, thus lowering and moving forward the combined CG relative to most other positions. There are labeled dots also toward the center of the P4 head and neck, as well as the flippers 802 and the chassis 801. These represent the individual component center of gravity for that piece. Movement of the centers of gravity of the head 803, neck 805, and flippers 802 effect the changes in combined CG position as described herein.

The depicted CG locations depend, of course, on the orientation of the vehicle. Climbing orientations with the chassis oriented at a pitch will of course have different CG locations, but the general CG shifting effect is exemplified in this drawing. CG locations also depend on flipper location and the relative weight of the flippers 802 to the rest of robot 800.

In the depicted embodiment, though not visible in this side representation, neck 805 is preferably adapted to move centrally between flippers 802 such that the flippers do not interfere with neck movement. Other positions may be used.

Note that the neck could be reversed from what is depicted above such that it pivots from the rear of the vehicle. This would shift the centroid of the CG range aft, which can be advantageous if more weight is packaged in the flippers.

FIG. 10 depicts elevated neck positions for two configurations. The location of the neck pivot, whether mounted at the front or rear of the chassis, affects how high the head can be elevated off the ground for surveillance. In both cases, the flippers can be used to elevate the head by either using "prairie-dog" (drive on flipper tracks only) or "bulldog" (run on the flipper tips and main tracks) poses. The former results in a higher head position as shown in FIG. 10.

Furthermore, it is possible to "combine" the chassis and the neck as a single entity, and have dual flippers on one end of the vehicle. In this case, the vehicle always rides on one or both sets of lightweight flippers, and the heavy neck can be pivoted about the front axle to supply the weight shifting ability. This concept requires longer flippers to effectively climb stairs, but has the benefit of having most of its weight concentrated in the neck to achieve large CG shifts. The head (which would be at the end of the neck) could be elevated by standing on the flipper tips to achieve the required height. This example is described in a copending Patent Application No. 60/828,611.

FIG. 11 depicts a robot 1100 in various positions crossing a crevasse. In operation, robot 1100 approaches the crevasse a (FIG. 11*a*) with neck 305 in a declined position that shifts the weight of the head and neck to move the robot's combined center of gravity (combined CG) to the spot marked CG6. In this configuration, robot 1100 may move straight toward crevasse A and roll forward until the front flipper contacts the opposing side of the crevasse. Because CG6 is never over the crevasse before the leading flipper edge is supported, robot 1100 does not fall.

After reaching the position shown in FIG. 11A, the robot pivots neck 305 to the second position depicted in FIG. 11B. In this position, the robot combined CG is at the point marked CG7, which is over the chassis portions that are supported, and thereby robot 1100 may move forward and complete the crevasse crossing without the trailing end falling into the crevasse.

As shown, there are two distinct crevice dimensions, "A" and "B", dictated by the location of the vehicle's CG relative to both of its outermost axles. Since any vehicle crossing a crevice must pass through both of these extremes, the maximum crevice that a vehicle can cross is always the smaller of "A" or "B". Note that for a typical vehicle with a fixed CG location, the sum of A and B is always the total length of the track span. Therefore the maximum crevice that a fixed-CG vehicle can cross can be no larger than half of the track span, and the CG must reside in the middle of the track footprint to do so. However, if the vehicle is capable of shifting its CG fore and aft, it is possible to cross much larger crevices. In this case, the maximum crevice is still the smaller of A or B, but the sum and A and B are now equal to:

$$A+B=\text{Track Span}+\text{CG Shift}$$

Since the maximum crevice would be when A=B, this gives:

$$\text{Maximum Crevice}=(\text{Track Span}+\text{CG Shift})/2$$

Therefore the crevice size can be increased by half of whatever CG shifting ability can be achieved, but the vehicle's "average" CG should still be in the middle of the track span or this gain is lost.

Figure 12:
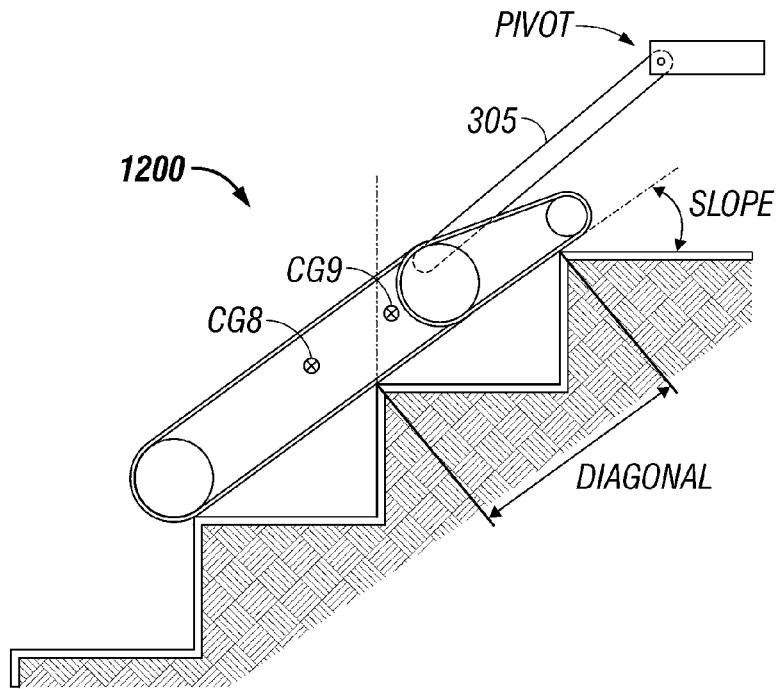
FIG. 12 depicts another robot CG shifting technique.

FIG. 12 depicts another robot CG shifting technique. Climbing stairs becomes very difficult as vehicle size decreases. It is desired that the vehicle be stable at any point during climbing to allow stopping and starting at any time and consistent performance at various speeds. To climb stairs stably, the vehicle CG must always be supported between two step edges. This means that as the CG traverses over the edge of a step, the vehicle must be at least long enough to simultaneously span from the next step edge to the previous step edge as shown below in FIG. 12. This means that the total track footprint (the entire length of track in contact with the ground) must be at least two "step diagonals" long.

The depicted robot 1200 in FIG. 12 has neck 305 deployed in a stair ascending position. Such position requires neck 305 to be pivoted forward such that the head and neck center of gravities are in front of the chassis. This provides, in the depicted scenario, a robot combined CG located at the point marked CG9. Because this point is in front of the chassis contact with the middle stair when the rearmost chassis contact leaves the lower stair (forward motion), robot 1200 is stabilized. Some embodiments of robots may be so small that forward stair climbing is not possible without such CG shifting. For example, a small robot may have a combined CG at the point CG8, which would not provide stable climbing because the rear end of the robot would sink along the lower step as forward progress is made. Such a robot, equipped with a head and neck as described herein, may shift its CG up to position CG9 for example, and climb successfully.

Figure 13:
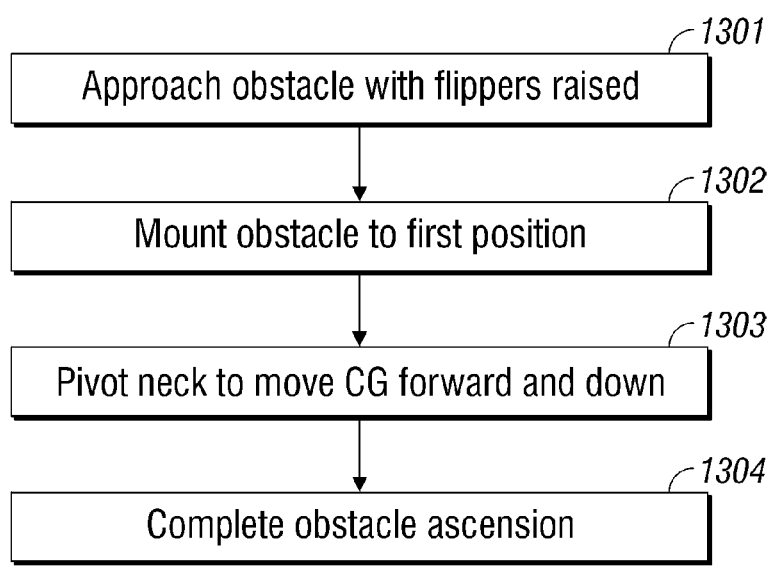
FIG. 13 is a flow chart of a method of ascending an obstacle.

FIG. 13 is a flow chart of a method of ascending an obstacle. The method is preferably employed with small robots having a neck and head as included herein, but may also be employed with larger robots or other vehicles. In Step 1301, the vehicle approaches the obstacle traveling forward and raises flippers (flippers are "front"). In step 1302 the vehicle mounts the obstacle preferably using it's drive and flipper tracks, to a position where the vehicle combined CG is either over the top edge of the obstacle or may be positioned there by CG adjustment. In step 1303 the vehicle pivots its neck to move the CG forward (toward direction of motion) and preferably downward. In step 1304, flippers and drives are then used to complete the ascension. Various robots may be remotely controlled to perform the various navigational functions described herein, or they may be controlled by a programmed controller, preferably housed on the robot. A combination of such control methods may also be used.

Figure 14:
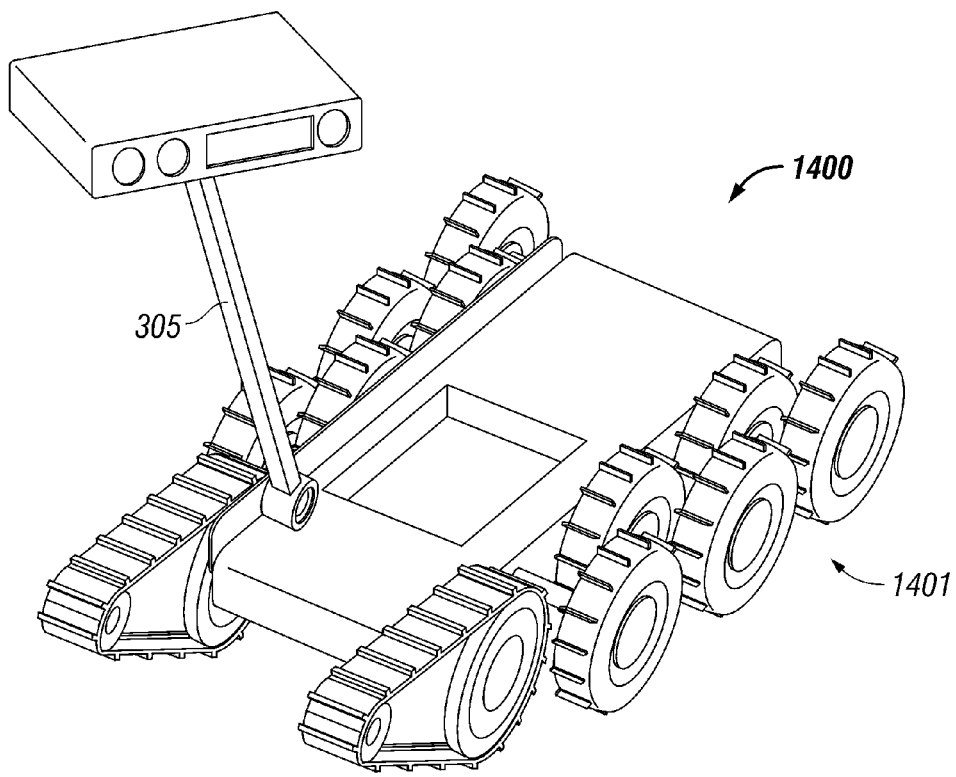
FIG. 14 shows a robot having a wheel drive.

FIG. 14 shows a robot 1400 having a wheel drive 1401. Wheels 1401 may be overlapped to provide track-like maneuvering capability. They may also be provided with independent suspension. Wheels 1401 may be commonly driven or independently driven. Robot 1400 may also perform the various CG shifting functions described herein.

Figure 15:
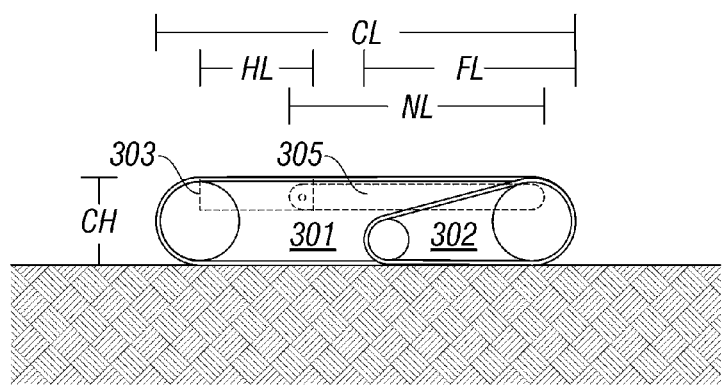
FIG. 15 depicts a robot in a stowed configuration.

FIG. 15 depicts a robot in a stowed configuration. Neck 303 and head 305 are stowed within the dimensions of chassis 301. Flippers 302 are also pivoted back and stowed within the chassis 301. This configuration provides a stowed length equal to the marked chassis length CL. That is, flipper length FL, neck length NL, and head length HL do not add to the combined length of the robot in this stowed position. Further, the flippers, head, and neck in stowed position do not extend beyond the chassis height marked CH (or beyond the chassis width.) One preferred robot design uses a CL of less than 24.5", a CH of less than 7.5", and a chassis width of less than 16".

Figure 16:
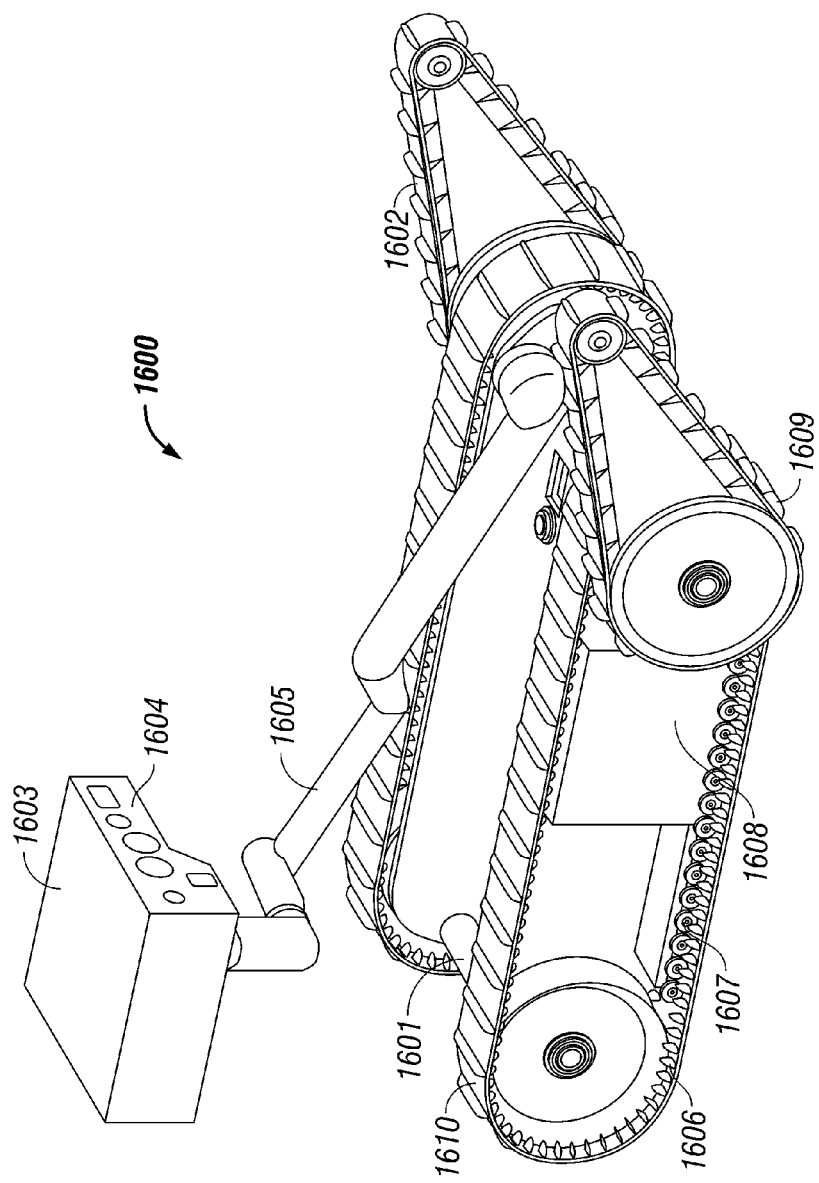
FIG. 16 depicts a perspective view of another robot vehicle.
Figure 17:
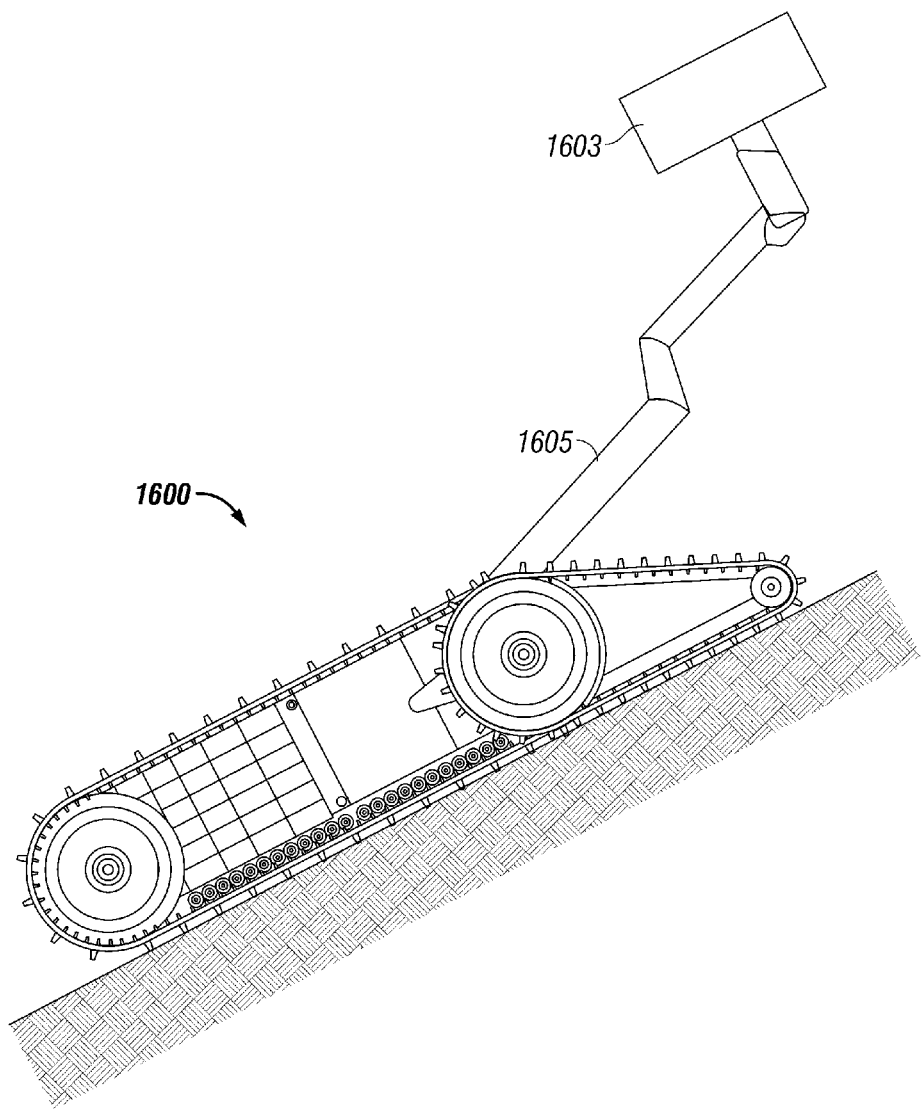
FIG. 17 depicts the robot of FIG. 16 in a climbing configuration.

FIG. 16 depicts a perspective view of another robot vehicle. FIG. 17 depicts the robot of FIG. 16 in a climbing configuration. Referring to FIGS. 16 and 17, the depicted robot vehicle has a chassis 1601 linked to a track drive comprising wheels 1606 and track 1610. The front of robot 1600 is provide with flippers 1602 having tracks driven by wheels 1600, which are linked to drive motors mounted on chassis 1601. The drive is preferably powered by power source 1608 which may be a battery or other power source mounted to chassis 1601. The drive wheels may be constructed according to techniques taught in U.S. Pat. No. 6,615,885, which has been incorporated by reference herein.

The depicted robot 1600 has an articulated neck 1605 which may orient head 1603 in various positions. FIG. 16 shows a typical maneuvering position with the neck angled backward, moving the combined center of gravity of robot further toward the rear end. This position may also allow viewing of flippers 1602 through visual sensors 1604. Bogie rollers 1607 support track 1610. Such rollers may be in a single line or may be staggered to provide more constant support for a track as it moves along a stair edge, for example.

FIG. 17 depicts robot 1600 in a position that may improve climbing capability. Flippers 1602 are deployed at a straight angle with the bottom of the chassis track drive. Neck 1605 is pivoted forward to move head 1603 in front of the vehicle and thereby shift forward the vehicle combined CG as described herein. Head 1603 is depicted rotated upon the final articulated portion of neck 1605, which may be employed to direct sensors 1604 to varied directions. The depicted angle of neck 1605 is exemplary, and neck 1605 may be deployed at various angles including below the angle of flippers 1602 in some implementations.

Figure 18:
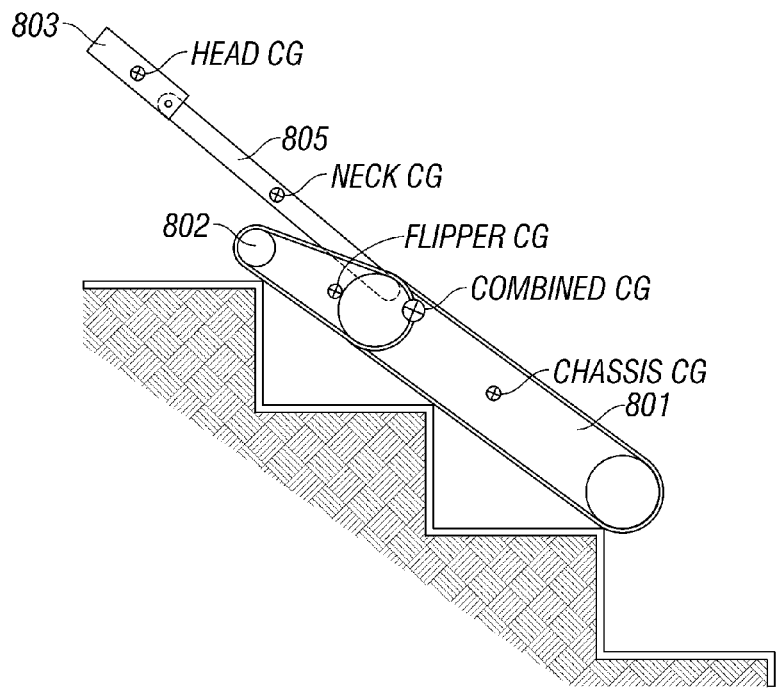
FIG. 18 depicts another robot in a stair climbing position with a forward-shifted combined CG.

FIG. 18 depicts another robot in a stair climbing position with a forward-shifted combined CG. The depicted robot has chassis 801 having a chassis CG marked toward its center. The robot is climbing a stairway. Flippers 802 are pivoted in a forward position along the stairway, having their lower track aligned with the bottom of the main drive track of chassis 801. The combined CG is depicted as a large target dot. This combined CG location is produced by orienting the flippers (having the depicted flipper CG) as indicated and by moving neck 805 (having the depicted neck CG) with head 803 (having the depicted head CG). The CG positioned at this point allows smoother climbing as the rearmost track crests the depicted rearmost stair edge. The head is pivoted upward to allow sensors to view directly up the stairs.

Figure 19:
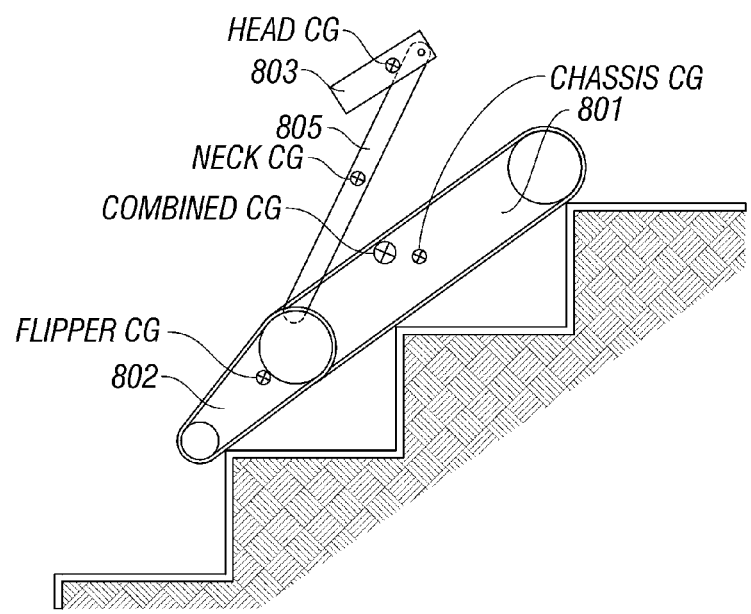
FIG. 19 depicts another robot in a stair descending position. In this configuration the robot has chassis pointing downward.

FIG. 19 depicts another robot in a stair descending position. In this configuration the robot has chassis 801 pointing downward. Neck 805 is pivoted back to move the combined CG (marked as "Combined CG") to its position above the central depicted stair edge. Head 803 is pivoted downward to view the path in front of the robot.

Figure 20:
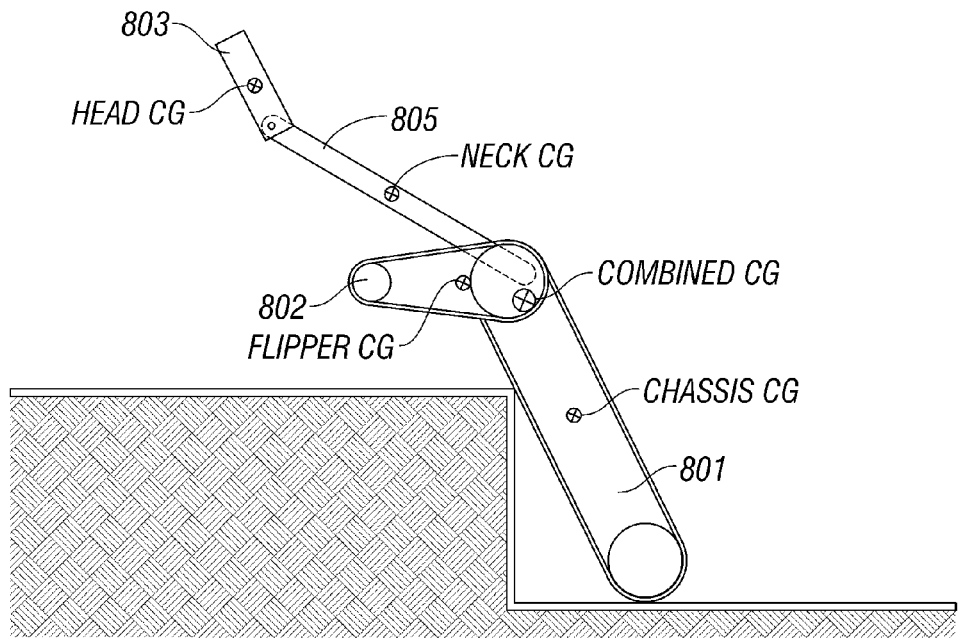
FIG. 20 depicts a robot climbing an obstacle forward.

FIG. 20 depicts a robot climbing an obstacle forward. The depicted robot employs its flipper 802 track drives and chassis 801 drive to crest the obstacle, then pivots forward flippers 802 and neck 805. Such movement shifts component weight to provide a combined CG at the depicted point above the crest of the obstacle, which enhances forward movement of the total robot mass on top of the obstacle.

Figure 21:
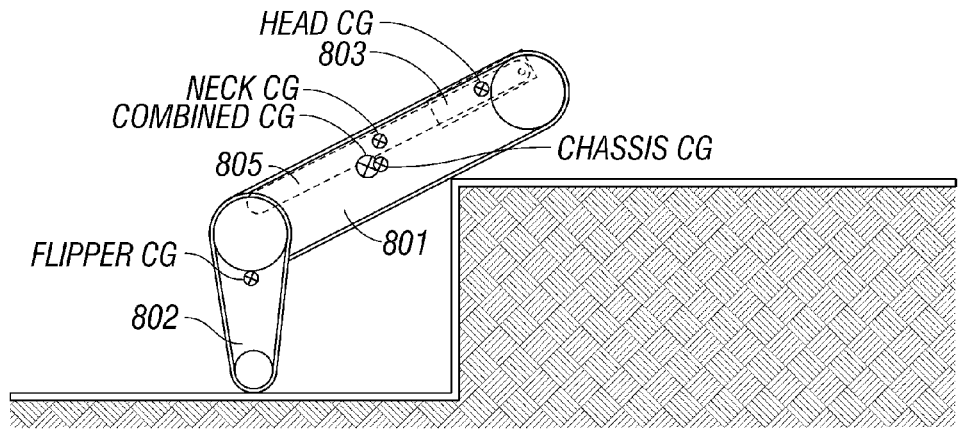
FIG. 21. shows a robot mounting an obstacle backwards.
Like reference symbols in the various drawings indicate like elements.

FIG. 21. shows a robot mounting an obstacle backwards. The depicted robot preferably approaches the obstacle in a manner depicted in FIG. 8. Neck 805 and head 803 are then stowed to move the combined CG lower and toward the desired direction of movement. This technique preferably places the combined CG above the crest of the obstacle as indicated and makes forward movement easier up the obstacle.

A number of embodiments of the invention have been described. Nevertheless, it will be understood that various modifications may be made without departing from the spirit and scope of the invention. For example, various construction materials may be used. Further, other techniques besides the depicted neck and head designs may be employed to do center of gravity shifting. Accordingly, other variations are within the scope of the following claims.

What is claimed is:

1. A robot capable of addressing various obstacles, comprising:
  a chassis supporting a skid steered drive and having a leading end, a trailing end, and a chassis center of gravity (chassis CG) therebetween;
  a set of driven flippers, each flipper having a pivot end, a distal end, and a flipper center of gravity (flipper CG) therebetween, each flipper being pivotable about a first pivot axis common with a drive axis near the leading end of the chassis;
  a neck having a pivot end, a distal end, and a neck center of gravity (neck CG) therebetween, the neck pivotable about a second pivot axis substantially at the leading end of the chassis; and
  a sensor head at the distal end of the neck, the head having a pivot end, a distal end, and a head center of gravity (head CG) therebetween, the head pivotable with respect to the neck about a third pivot axis at the distal end of the neck;
  the chassis, flippers, neck and head:
    (i) having a combined center of gravity (combined CG) disposed in a fore-aft sense between the distal and pivot ends of the flippers when the flippers are in a stowed position with their distal ends between the leading and trailing ends of the chassis, and
    (ii) being movable between a first position and a second position to overcome an obstacle; and
  a programmed controller configured, by a plurality of executable instructions stored on the controller, to direct the robot to:
    approach a plurality of stairs having a first pitch and a first step span;
    raise the flippers to an angle of at least about 30 degrees;
    mount a lowermost stair to a first position where the chassis is oriented at approximately the first pitch;

adjust flipper orientation to approximately match the first pitch; and adjust the position of the overall gravitation center of the robot (robot CG) by moving the neck forward into a stair ascending position in which the head CG is forward of the chassis CG; and climb the stairs by driving the flippers and the skid steered drive and maintaining the flipper orientation to approximately match the first pitch so that the robot spans at least two step edges.

2. The robot of claim 1, wherein the first position is a stair ascending position in which the head, neck, and flipper CGs are each forward of the leading end of the chassis such that the combined CG is forward of the chassis CG, and the second position is a stair descending position in which the head and neck CGs are disposed rearward of the leading end.

3. The robot of claim 1 configured for climbing stairs having a pitch and step span, and wherein:

the chassis includes tracks defining a rearmost main track ground contact point;

each flipper includes a track defining a foremost flipper ground contact point;

the first position is a stable stair ascending position in which the head, neck, and flipper CGs are positioned to shift a vertical projection of the overall CG to at least one step span in front of the rearmost main track ground contact point and at least one step span behind the foremost flipper track ground contact point; and the second position is an unstable stair ascending position in which the head, neck, and flipper CGs are positioned to shift a vertical projection of the overall CG to outside a stable range.

4. The robot of claim 1, wherein the first position is a crevasse approach position in which the head and neck CGs are aft of the leading end and aft of the combined CG, shifting the combined CG toward the trailing end, and the second position is a crevasse traversing position in which the head, neck, and flipper CGs are each fore of the leading end of the robot, shifting the combined CG toward the leading end.

5. The robot of claim 1, wherein the neck is adapted to carry payloads.

6. The robot of claim 1, wherein the flippers house at least part of a robot energy storage device and have a density higher than an average density of the robot.

7. The robot of claim 1, wherein the neck comprises at least one payload carrying fixture.

8. The robot of claim 1, further comprising a payload deck configured to support a removable cargo; and a linkage connecting the payload deck to the chassis, the linkage having a first end rotatably connected to the chassis at a first pivot, and a second end rotatably connected to the deck at a second pivot.

9. The robot of claim 1, wherein the flippers are operable to pivot about a front wheel drive axis of the chassis.

10. The robot of claim 1, wherein the sensor head comprises about 15 percent of a total weight of the robot.

11. The robot of claim 1, wherein the neck comprises about 5 percent of a total weight of the robot.

12. The robot of claim 1, wherein the set of flippers is constructed to have a lower density than that of the skid steered drive.

13. The robot of claim 1, further comprising a rear set of flippers.

14. A method of controlling a robot to climb stairs having a first pitch and a first step span, wherein the robot comprises:

a chassis supporting a skid steered drive and having a leading end, a trailing end, and a chassis center of gravity (chassis CG) therebetween;

a set of driven flippers, each flipper having a pivot end, a distal end, and a flipper center of gravity (flipper CG) therebetween, each flipper being pivotable about a first pivot axis common with a drive axis near the leading end of the chassis;

a neck having a pivot end, a distal end, and a neck center of gravity (neck CG) therebetween, the neck pivotable about a second pivot axis substantially at the leading end of the chassis; and a sensor head at the distal end of the neck, the head having a pivot end, a distal end, and a head center of gravity (head CG) therebetween, the head pivotable with respect to the neck about a third pivot axis at the distal end of the neck, the chassis, flippers, neck and head:

(i) having a combined center of gravity (combined CG) disposed in a fore-aft sense between the distal and pivot ends of the flippers when the flippers are in a stowed position with their distal ends between the leading and trailing ends of the chassis, and (ii) being movable between a first position and a second position to overcome an obstacle;

the method comprising directing the robot to:

approach the stairs;

raise flippers to an angle of at least about 30 degrees;

mount a lowermost stair to a first position where the chassis is oriented at approximately the first pitch;

adjust flipper orientation to approximately match the first pitch;

adjust the position of the overall gravitation center of the robot (robot CG) by moving the neck forward into a stair ascending position in which the head CG is forward of the chassis CG; and climb the stairs by driving the flippers and the skid steered drive and maintaining the flipper orientation to approximately match the first pitch so that the robot spans at least two step edges.

15. The method of claim 14, wherein the robot has a furthest rear main track ground contact and a front-most front ground contact; further comprising moving the neck and the head between a stair ascending position in which a vertical projection of the robot CG is located in a stable range at least one step span in front of the furthest rear main track ground contact and at least one step span behind the front most front track ground contact, and at least one alternate position in which the vertical projection of the robot CG is outside of the stable range.

16. A method of controlling a robot to overcome an obstacle, the method comprising directing the robot to perform the following tasks:

approach the obstacle;

raise a set of flippers of the robot to an angle to mount the obstacle, each flipper in the set of flippers having a pivot end, a distal end, and a flipper center of gravity (flipper CG) therebetween, each flipper pivotable about a first pivot axis;

mount the obstacle to a first position where a chassis of the robot is oriented at a first pitch, the chassis of the robot having a chassis center of gravity (chassis CG);

adjust the flippers to an orientation to match the first pitch, whereby a robot center of gravity (robot CG) is shifted at least laterally toward the obstacle; and adjust the robot center of gravity by moving a neck of the robot forward into an obstacle mounting position, wherein the neck includes a pivot end, a distal end, and a neck center of gravity (neck CG) therebetween, the neck pivotable about a second pivot axis, the neck further including a sensor head at the distal end of the neck, the sensor head having a head center of gravity (head CG), and wherein adjusting the neck includes moving the neck and the sensor head between:

an obstacle ascending position in which a vertical projection of the robot CG is located in a stable range between one step span in front of a rear-most ground contact point of the robot and one step span behind a front most front ground contact and in which the head CG is forward of the chassis CG, and at least one alternate position in which the vertical projection of the robot CG is outside of the stable range.

17. The method of claim 16, wherein the adjusting the robot CG moves the robot CG downward.

18. The method of claim 16, wherein the flippers house at least part of a robot energy storage device and have a density higher than an average density of the robot.

19. The method of claim 16, wherein the neck comprises payload-carrying fixtures.

* * * * *